(12) United States Patent
McGee et al.

(10) Patent No.: US 7,505,399 B2
(45) Date of Patent: Mar. 17, 2009

(54) RECEIVE LOAD BALANCING ON MULTIPLE NETWORK ADAPTERS

(75) Inventors: Michael Sean McGee, Round Rock, TX (US); Mark R. Enstone, Austin, TX (US); Mark C. Stratton, Georgetown, TX (US); Christopher L. Hughes, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 10/917,677

(22) Filed: Aug. 13, 2004

(65) Prior Publication Data
US 2006/0034190 A1    Feb. 16, 2006

(51) Int. Cl.
*H04L 12/26* (2006.01)
(52) U.S. Cl. .................. 370/216; 370/230; 370/465
(58) Field of Classification Search ............... 370/216, 370/230
See application file for complete search history.

(56) References Cited

U.S. PATENT DOCUMENTS

| | | | |
|---|---|---|---|
| 6,151,297 A * | 11/2000 | Congdon et al. | 370/216 |
| 6,229,538 B1 | 5/2001 | McIntyre et al. | |
| 6,490,632 B1 | 12/2002 | Vepa et al. | |
| 6,560,630 B1 | 5/2003 | Vepa et al. | |
| 6,567,377 B1 * | 5/2003 | Vepa et al. | 370/230 |
| 6,590,861 B1 * | 7/2003 | Vepa et al. | 370/216 |
| 6,683,882 B1 | 1/2004 | Maufer et al. | |
| 2004/0158651 A1 * | 8/2004 | Fan et al. | 710/1 |

OTHER PUBLICATIONS

Hewlett-Packard Company; "hp Proliant Network Adapter Teaming"; Technical White Paper, Jun. 2003; pp. 1-49.

* cited by examiner

*Primary Examiner*—Chi H Pham
*Assistant Examiner*—Albert T Chou (57) ABSTRACT

Systems, methodologies, media, and other embodiments associated with network load balancing are described. One exemplary system embodiment includes a load balancing logic configured to cause different portions of network traffic to be transmitted from a transmitting node to different network adapters in a receiving node to cause the network traffic to be receive load balanced.

33 Claims, 6 Drawing Sheets

| MAC Address | Port Speed | Port Cost |
|---|---|---|
| E | 5 | 10 |
| F | 5 | 15 |
| G | 7 | 10 |
| H | 10 | 20 |

Peer Data Store 230

| Protocol Address | MAC Address |
|---|---|
| 1.1.1.2 | E, F, G, H |
| 1.1.1.3 | X, Y |
| 1.1.1.5 | M, N, O |
| ... | ... |

RECEIVE LOAD BALANCING ON MULTIPLE NETWORK ADAPTERS

BACKGROUND

Devices on a computer network use unique addresses, much like telephone numbers to communicate with each other. Each device, depending on it's function, will use one or more of these unique addresses. The addresses can correspond to one or more layers of the open system interconnection (OSI) model. Based on the OSI model, network devices use an address at layer 2 (data link layer) called a media access control (MAC) address, and an address at layer 3 (network layer) called a protocol address. Examples of protocol addresses can include an Internet Protocol (IP) address, an Internetwork Packet eXchange (IPX) address, and an AppleTalk address. A MAC address can be regarded as an address that is assigned to the hardware, whereas a protocol address can be regarded as an address assigned to the software.

Some network devices, such as a server, may include multiple network adapters (e.g., network interface cards (NIC)), that are configured as a team. When network adapters are teamed together, they function as a single virtual network adapter. Other network devices communicating with a network adapter team cannot distinguish that they are communicating with more than one network adapter. In one example, for a network adapter team to appear as a single virtual network adapter, all networking devices refer to the team by a single layer 2 address and a single layer 3 address. In other words, when a device is communicating with a team, regardless of the number of network adapters that make up the team, the network device only "sees" one MAC address and one protocol address. When communicating using IP, this means that a networking device will have one table entry in its address resolution protocol (ARP) cache for a network adapter team regardless of the number of network adapters that are configured within the team. Additional examples and descriptions of network teaming may be found in a technical white paper entitled "HP ProLiant Network Adapter Teaming", June 2003.

Prior load balancing solutions do not allow for end-to-end load balancing because network communications between nodes use a single MAC address as an end-point identifier and load balancing criterion. Transmitted frames are sent to the same destination MAC address of a team network adapter (based on the ARP table entry), resulting in all frames being received on the same network adapter in the node.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems, methods, media, and other embodiments are described herein that relate to load balancing of network communications. In one example, a network configuration can include two point-to-point end nodes that can communicate with each other. One or both of the end nodes can include multiple network adapters that are teamed together and function as a single virtual network adapter. To other nodes on the network, the team of network adapters is seen an a single adapter and identified by a single media access control (MAC) address and single protocol address that is assigned to the team.

In one example system, a load balancing logic can be configured to allow a destination end node, which includes a team of network adapters, to be recognized as having the ability to receive network communications on more than one MAC address for the same protocol address. For example, network communications being transmitted to the destination node having a destination address, can have the destination address replaced and alternated between multiple destination MAC addresses assigned to the individual network adapters within the destination node. In this manner, different destination MAC address can be used to reach the team of network adapters causing the destination node to receive the network communications on multiple ports and achieve receive load balancing.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, a cache, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servlet, an applet, instructions stored in a memory, part of an operating system, part of a driver, or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Of course, types of software can change over time and the present examples are not limited to a particular type of software. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium can have a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, selecting, directing, determining, replacing, transmitting, or the like, refer to actions and processes of a computer system, logic, processor, or similar electronic device that manipulates and transforms data represented as physical (electronic) quantities.

Figure 1:
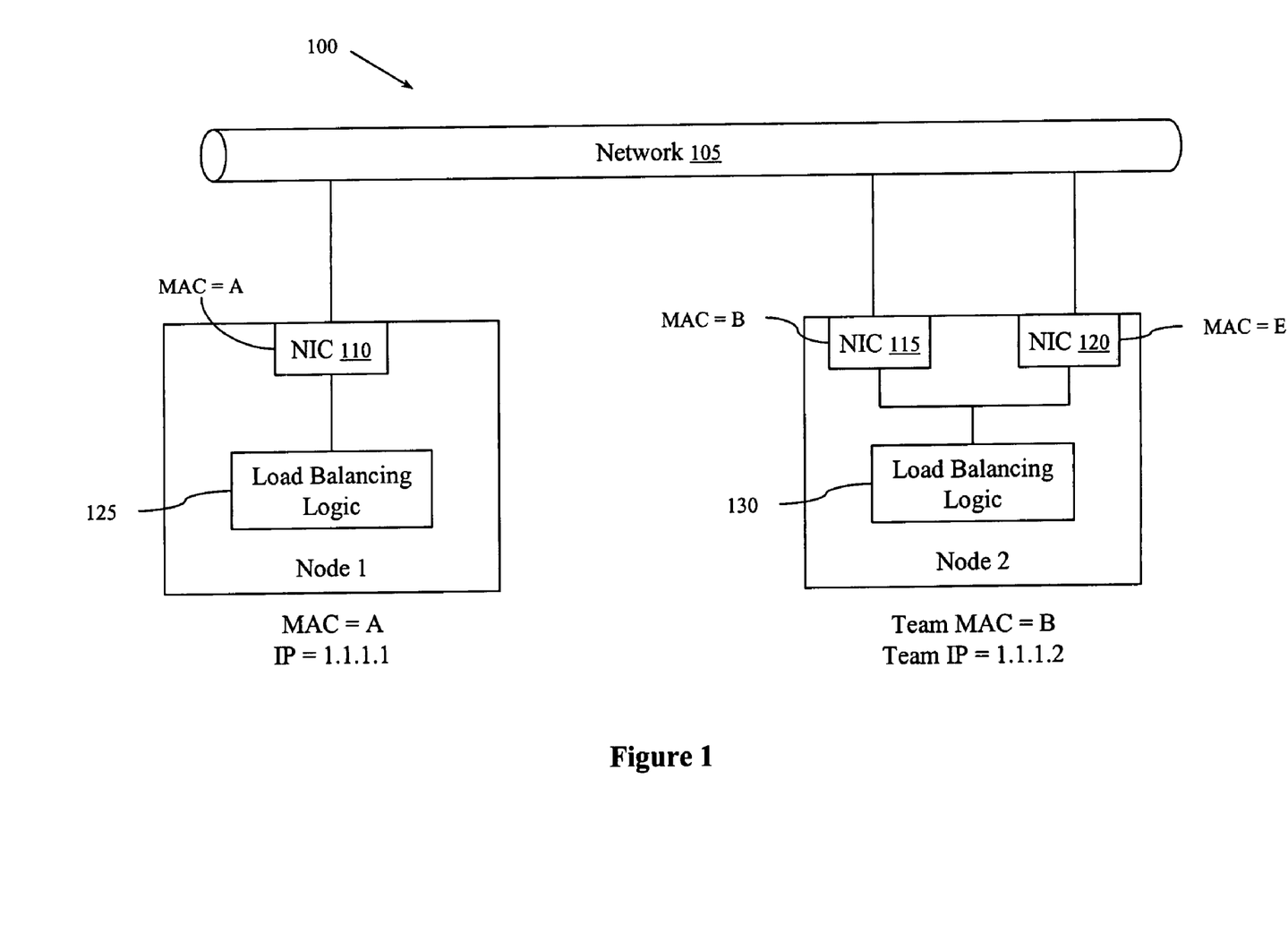
FIG. 1 illustrates an example system having load balancing for point-to-point end nodes.

Illustrated in FIG. 1 is one example of a network system configuration 100 that includes a node 1 and a node 2 operably connected together over a network 105 such as an Ethernet. Other types of network architectures that can also be used include ARCnet, Token Ring, Fiber Distributed Data Interface (FDDI), or other type of local area network. In the following example, node 1 will be described as a transmitting node that will transmit network communications to node 2 (a receiving node). Node 1 and node 2 can be any form of computing devices and are configured as point-to-point nodes on the same network layer (e.g., the same layer 2 network).

Node 1 and node 2 can be in communication with the network 105 through network adapters like network interface cards (NIC). Node 1 is shown with one NIC 110 and node 2 includes NIC 115 and NIC 120. Of course, any desired number of network adapters can be used. In node 2, NIC 115 and NIC 120 are configured as a team of network adapters that function as a single virtual/logical network adapter. The single virtual network adapter will be "seen" by other network nodes as a single NIC regardless of the number of NICs that may be present in the team of adapters. For example, node 2 can be identified or "seen" by node 1 by a single hardware address (e.g. a media access control (MAC address)) and a single protocol address (e.g., IP, IPX, AppleTalk).

For purposes of explanation, let the team protocol address of node 2 be 1.1.1.2 and the team MAC address be "B." For the individual network adapters, NIC 115 has a MAC address of B and NIC 120 has a MAC address of E. Simplified MAC addresses are used in these examples although the current standard format of a MAC address is 00-00-00-00-00-00 (hexadecimal). The team MAC address can be selected from one of the team members. Referring to node 1, let the MAC address of NIC 110 be "A" and it's protocol IP address be 1.1.1.1. The current standard format for an Internet Protocol (IP) address is 0.0.0.0 (dotted decimal) and for an Internetwork Packet exchange (IPX) addresses are in the format of 000000.000000000000 (hexadecimal). It will be appreciated that formats and standards may change in the future and that the present system is adaptable to those changes.

When network communications are to be transmitted from node 1 to node 2, logic within node 1 is configured to assemble the network communications to include a destination node address that includes a MAC address and a protocol address. In one example, the network communications include frames. In a typical transmission, the destination node address within each frame would be set as the team MAC of "B" and the team protocol address of 1.1.1.2. Since NIC 115 within node 2 is assigned MAC address "B," all of the frames would be transmitted to and received by NIC 115.

To influence or otherwise provide receive load balancing of network communications on the receiving node (e.g., node 2), the transmitting node (e.g., node 1) can include a load balancing logic 125 configured to cause different portions of the network communications from node 1 to be transmitted to different network adaptors in the receiving node 2 to cause the network communications to be receive load balanced. In one example, the load balancing logic 125 can be configured to replace the destination node address in selected frames directed to the team address of node 2 to varying destination node addresses of the multiple network adapters (e.g., NIC 115, NIC 120) in the destination node 2.

As previously explained, the team address causes node 2 to be seen as having a single virtual network adapter. However, the load balancing logic 125 can override and replace the team MAC address from selected frames to be either MAC address "B" or MAC address "E," which are the MAC addresses of NIC 115 and NIC 120, respectively. As such, the frames will be transmitted to and received by multiple network adapters in node 2 rather than being received by only one adapter. Of course, having additional NICs within the team can provide for additional destinations for receive load balancing.

In one example of varying the destination node addresses, the load balancing logic 125 can include a predetermined list of MAC addresses associated with the multiple network adapters (e.g., NIC 115, NIC 120) that are configured as a team within node 2. For example, addresses may be manually and/or programmatically configured for adapters within network teams. The MAC addresses can be maintained in a data store (not shown) configured to associate multiple MAC addresses to a single protocol address assigned to the destination node. In the illustrated example, MAC addresses of "B" and "E" would be associated to the single IP address of 1.1.1.2 of node 2. It will be appreciated that the data store used for receive load balancing can be an address association list maintained separately from an address resolution protocol (ARP) table (not shown) that is used to resolve one or more protocol addresses to a single MAC address, but not vise versa.

The load balancing logic 125 can select different MAC addresses from the data store that are associated to node 2 and replace the destination node address in the network communications (e.g., frames) directed to node 2 with a MAC address of different NICs within the team of node 2. For example, the destination node address can be interchanged between the MAC address of NIC 115 and NIC 120 for frames being transmitted by node 1. In this manner, the network communications can be receive load balanced between the multiple network adapters of node 2.

It will be appreciated that other configurations of the components shown in FIG. 1 can be used. For example, node 1 can include multiple network adapters that are teamed to function as a single virtual network adapter. Other nodes on the network 105, such as node 2, can also include a load balancing logic 130 that is configured to transmit network communications to node 1 by distributing the network communications to multiple network adapters that may be part of the team of adapters in node 1. A node may have any number of network adapters that are teamed together and the network may include two or more end-to-end nodes.

Figure 2:
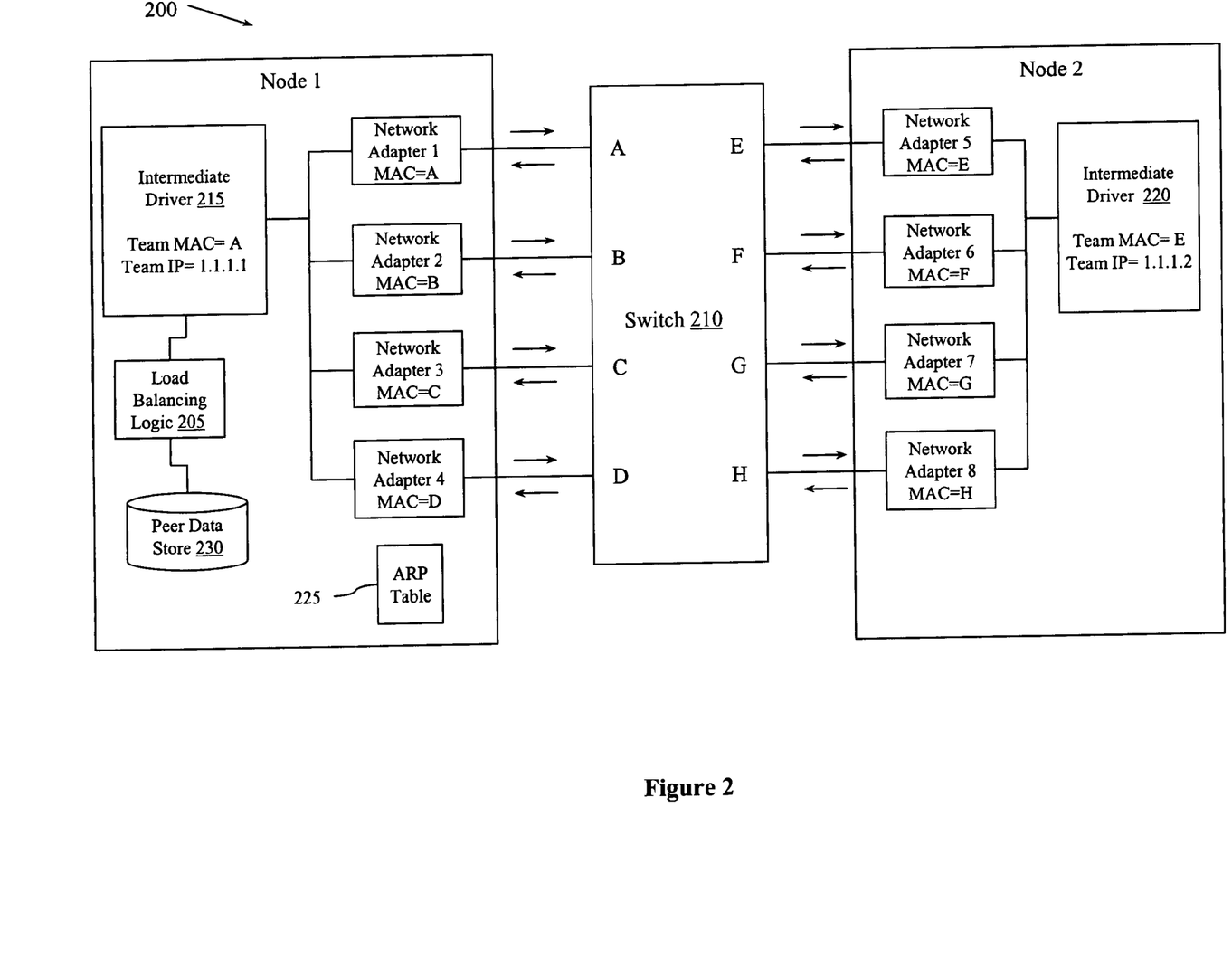
FIG. 2 illustrates an example configuration of network nodes that include load balancing logic.

FIG. 2 illustrates an example point-to-point system 200 that includes one example of a load balancing logic 205 that can influence receive load balancing. The system 200 is another example configuration of the system 100 shown in FIG. 1. The point-to-point system 200 includes node 1 and node 2 that are configured as point-to-point end nodes and are on the same broadcast domain (e.g. on the same layer 2 network). The nodes 1 and 2 can be operably connected over the network by a switch 210 but can also be configured without the switch 210. Nodes 1 and 2 may be, for example, a server or other computing device capable of network communication. Additional nodes may also be part of the network.

Nodes 1 and 2 both include an example configuration that has four network adapters and that are teamed together to function as a single virtual network adapter. Techniques and examples describing teaming configurations are disclosed in U.S. Pat. No. 6,229,538 entitled "Port-Centric Graphic Representations of Network Controllers," which is incorporated herein in its entirety by this reference. Of course, any number of network adapters can be used. A network adapter will also be referred to as a network interface card (NIC). It will be appreciated that a reference to multiple NICs or network adapters may be intended as a plurality of interface cards or as a single interface card having a plurality of NIC ports.

With further reference to FIG. 2, node 1 can include four network adapters 1-4 and each is assigned a unique MAC address A-D, respectively. The network adapters 1-4 are teamed together and share the same team protocol address of 1.1.1.1 (e.g., IP address). The team also has a team MAC address of "A" that is selected from one of the network adapters. Similarly, node 2 includes four network adapters 5-8 that have unique MAC addresses E-H, respectively. Network adapters 5-8 are also configured as a network team and are assigned a team MAC address of "E" and a team IP address of 1.1.1.2.

Node 1 and node 2 can include a driver that configures and coordinates communications with the team of network adapters. For example, in the Windows® 2000 operating system, an intermediate driver can be configured to operate in the intermediate layer of the operating system that operates mini port drivers of the network adapters 1-4 to function as a single virtual network adapter. The intermediate driver also interfaces with the network driver interface specification (NDIS layer) of the Windows® 2000 operating system. A network adapter driver would reside in the mini port layer and would directly control the hardware of the network adapters 1-4. Details of the Windows®2000 operating system are beyond the scope of this disclosure and will not be described in further detail. Similarly, node 2 includes an intermediate driver 210 that interfaces with the network adapters 5-8 to cause them to operate as a single virtual network adapter. Of course, other types of drivers can be used as well as other types of operating systems. Examples of such drivers are described in previously referenced U.S. Pat. No. 6,229,538.

In the following example, node 1 will be transmitting network communications to node 2. Network communications transmitted from node 1 will include a destination node address that includes a MAC address and an IP address. Of course, other information can be included within each frame such as header information, a source address, and data. However, the destination address is involved in the present examples.

Since the network adapters 5-8 are configured as a team within node 2, the destination MAC address would be "E" and the destination IP address would be "1.1.1.2", which is the node address of the virtual network adapter. The team address could be stored within node 1 in an address resolution protocol (ARP) table 225. However, the load balancing logic 205 can be configured to determine whether network communications are directed to a peer node and to cause the network communications to be receive load balanced on node 2. Peer nodes include nodes that are on the same network layer.

For example, the load balancing logic 205 can be configured to reassign the destination MAC address for network communications to be transmitted from node 1 to a selected MAC address from one of the network adapters 5-8 of the network team. In one example, a peer data store 230 can be configured to maintain MAC addresses assigned to individual network adapters within the team of network adapters of node 2. The peer data store 230 can be accessible by the load balancing logic 205 and may be local to node 1. For example, the network communications can include multiple frames that may initially be intended to be transmitted to a destination MAC address of the team MAC address "E". However, the load balancing logic 201 can replace the destination MAC address within selected frames to be a selected MAC address from the network adapters 5-8. In this manner, the multiple frames can be distributed between the network adapters 5-8 since the frames will be transmitted to different network adapters, thus providing receive load balancing. A selection algorithm may also be provided to select the MAC address from an available set of MAC addresses that are associated to the team IP address.

Figure 3:
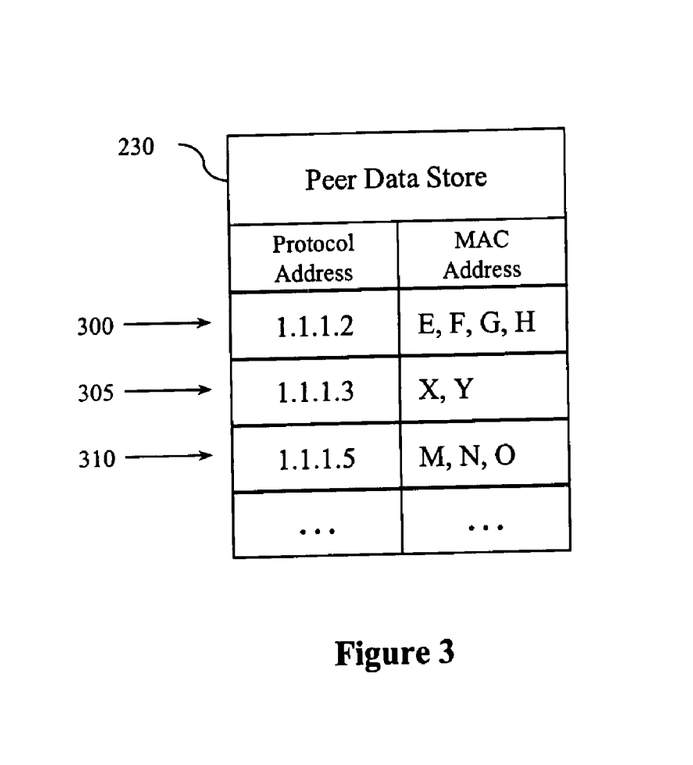
FIG. 3 illustrates an example data structure that may be used to implement a data store.

One example of the peer data store 230 is illustrated in FIG. 3. The peer data store 230 can include entries for associating protocol addresses of peer nodes with one or more MAC addresses that may be teamed together under the same protocol address. For example, entry 300 represents a protocol address of 1.1.1.2 which is the team protocol address of node 2 in FIG. 2. Associated with that protocol address are the MAC addresses of the network adapters forming the team, which include MAC addresses E, F, G, and H. Other entries 305 and 310 can be included in the peer data store 230 that are associated with other peer nodes of node 1 that may be on the same network but are not illustrated in FIG. 2. As such, the peer data store 230 can be configured to associate multiple MAC addresses from a group of network adapters to a single team protocol address. As previously explained, this differs from the ARP table 225 that is limited to associating a single MAC address to a protocol address.

The selection algorithm can be based on a variety of algorithms which may include a sequential selection, a random selection, a selection based on a port attribute of a network adapter, or other selection process. For example, based on a sequential selection process where the available MAC addresses are E, F, G, and H as shown in node 2 of FIG. 2, the load balancing logic 205 can replace the destination MAC address for each outgoing frame to incrementally change between the available MAC addresses and then repeat the cycle with the starting MAC address of "E".

Figure 4:
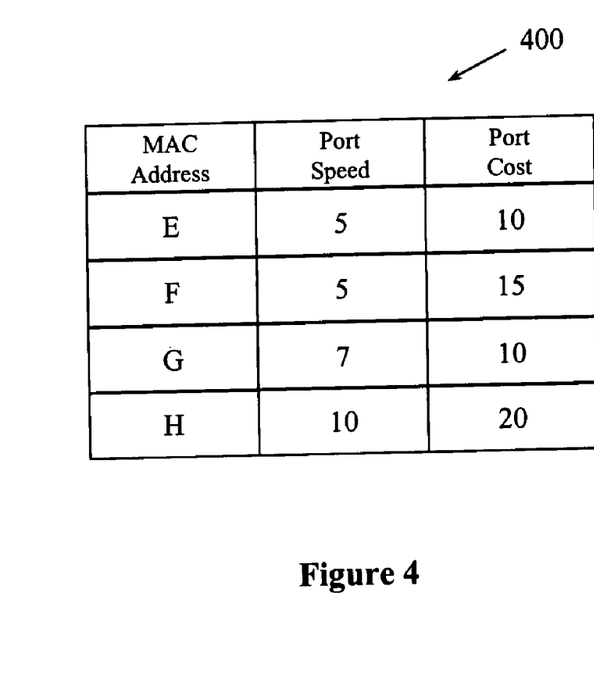
FIG. 4 illustrates an example data store for maintaining port attributes.

In another example, port attributes can be maintained within node 1 as part of the peer data store 230 or as a separate data store, which may be used as part of the process to select a destination MAC address for an outgoing frame. An example set of port attributes are shown in FIG. 4 as table 400. Example port attributes may include port speed, port cost, or other type of attribute that may be associated with a candidate network adapter within node 2. For example, an associated port speed and/or port cost can be maintained for each network adapter 5-8. As seen in table 400, MAC address "H" has a port speed of "10." If it is desirable to transmit network communications more frequently to a network adapter with a higher port speed, the load balancing logic 205 can assign a destination MAC address of "H" more frequently to outgoing frames than other MAC addresses E-G. It should be noted that table 400 uses example values that do not reflect a particular type of unit. Rather, the values are only shown to illustrate greater or lesser values relative to the different MAC addresses in the table. Furthermore, other selection process examples should be readily understood to those of ordinary skill in the art.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 5:
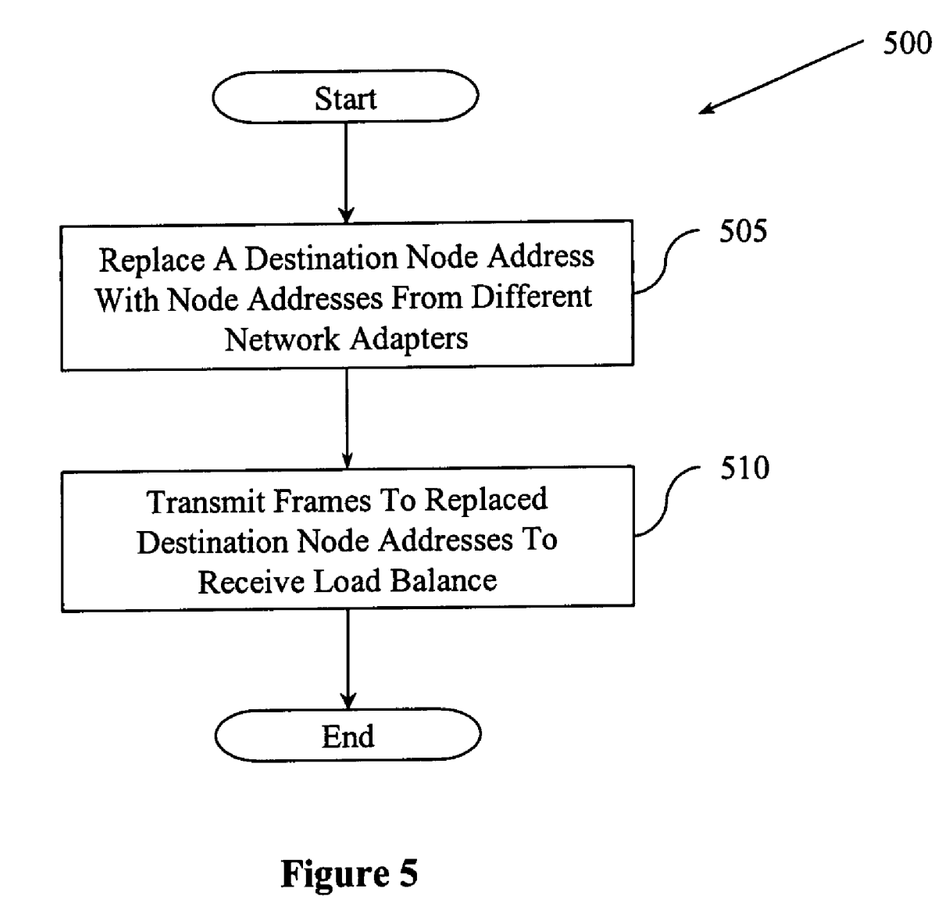
FIG. 5 illustrates an example methodology that may be associated with load balancing of network communications.

Illustrated in FIG. 5 is an example methodology that can be associated with transmitting network communications between point-to-point end nodes of a network to achieve receive load balancing on the receiving node. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 5, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing. In one example, methodologies are implemented as processor executable instructions and/or operations stored on or provided by a computer-readable medium. The foregoing applies to all methodologies and examples described herein.

With reference to FIG. 5, the example methodology 500 will be described where at least one of the end nodes includes a virtual network adapter configured with a plurality of network adapters. Network communications can include multiple frames that are directed to the receiving node. The methodology 500 can begin by replacing a destination node address in a plurality of frames directed to the virtual network adapter. The destination node address can be replaced to a destination node address of different individual network adapters from the plurality of network adapters (Block 505). Similar to previous examples, the destination node address may initially be intended for a team node address but is re-assigned and distributed between different individual network adapters (e.g. NICs) that are part of the network team. The frames can then be transmitted to the replaced destination node addresses causing them to be receive load balanced between the plurality of network adapters rather than being received by a single node address of the virtual network adapter associated with the team (Block 510).

In one example, the transmitting Block 510 can occur between point-to-point end nodes that are on the same data link layer network. The replaced destination node address can be a hardware address like a media access control (MAC) address. In another example, the replacing Block 505 can include selecting an alternative destination node address of an individual network adapter from the plurality of network adapters based on a port attribute of the individual network adapter. The previous example of using port cost and/or port speed can be applied to this step.

In another example of the methodology 500, a data store may be maintained that includes individual node addresses of the plurality of network adapters associated with the virtual network adapter. For a frame having a first destination node address, the process can determine whether the first destination node address is directed to the virtual network adapter, and if so, an individual node address from the data store can be selected to replace the first destination node address. For example, using the example peer data store 230 shown in FIG. 3, a determination can be made as to whether a frame is directed to a virtual network adapter that represents a network team. The peer data store 230 can be configured to only include protocol addresses of virtual network adapters and their associated team of MAC addresses. As such, if a destination node address includes a protocol address that is present within the peer data store 230, that indicates that the frame is directed to a virtual network adapter. Then, the destination MAC address can be selected from the available group of MAC addresses associated with the protocol address. Various selection algorithms can be used as previously described.

Figure 6:
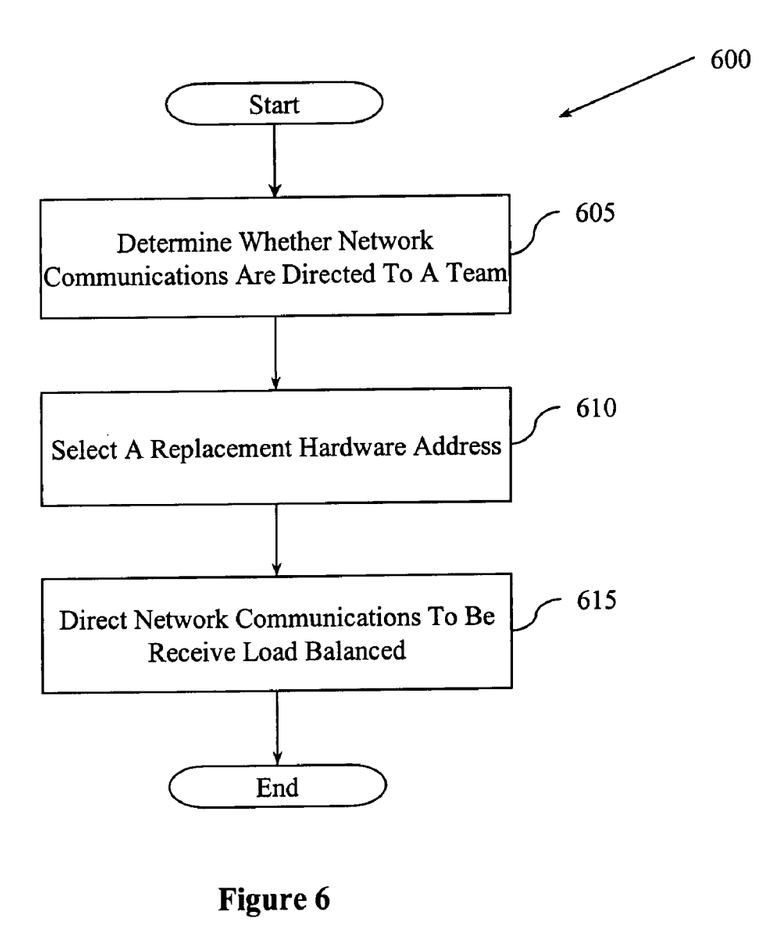
FIG. 6 illustrates another example methodology that may be associated with load balancing of network communications.

Illustrated in FIG. 6 is an example methodology 600 that can be associated with receive load balancing on a team of network adapters. The methodology, in one example, can be implemented on a computer-readable medium that provides processor executable instructions operable to perform the methodology. The methodology 600 can include determining whether network communications are directed to a receiving node that is connected point-to-point and that includes a team of network adapters (Block 605). The receiving node can be identified by a team protocol address and a team hardware address. A replacement hardware address for the network communications can then be selected from a list of hardware addresses corresponding to the team of network adapters (Block 610). The network communications are then directed to be received load balanced by the team of network adapters by periodically replacing the destination address to a selected replacement hardware address (Block 615).

With reference again to FIG. 3, the peer data store 230 is one example of a data structure that can be provided by a computer-readable medium. The peer data store 230 can be configured to resolve a selected protocol address, assigned to a team of network adapters, to multiple hardware addresses that are assigned to the individual adapters of the team. The data structure can be manually and/or programmatically configured.

The peer data store 230 can include a first field that contains data representing a software address for a network node. This may correspond to the protocol address of a networked team such as IP address "1.1.1.2" in entry 300. One or more second fields can contain data representing an association of a plurality of hardware addresses assigned to the network node that correspond to the software address. An example second field may include the one or more MAC addresses that are associated with the protocol address shown in the peer data store 230. The hardware addresses (e.g., MAC addresses) can be assigned to the plurality of network adapters that are configured as part of the network node. The data structure can be configured to resolve the software addresses to any of the plurality of hardware addresses to allow a logic to cause network communications directed to the network node to be receive load balanced among the plurality of network adapters.

In one example the software address can be a layer 3 network address and the hardware address can be a layer 2 network address. As in previous examples, the plurality of network adapters can be configured as a single virtual adapter where the network node is identified by other network nodes as the single virtual adapter by a single software address and a single hardware address.

Figure 7:
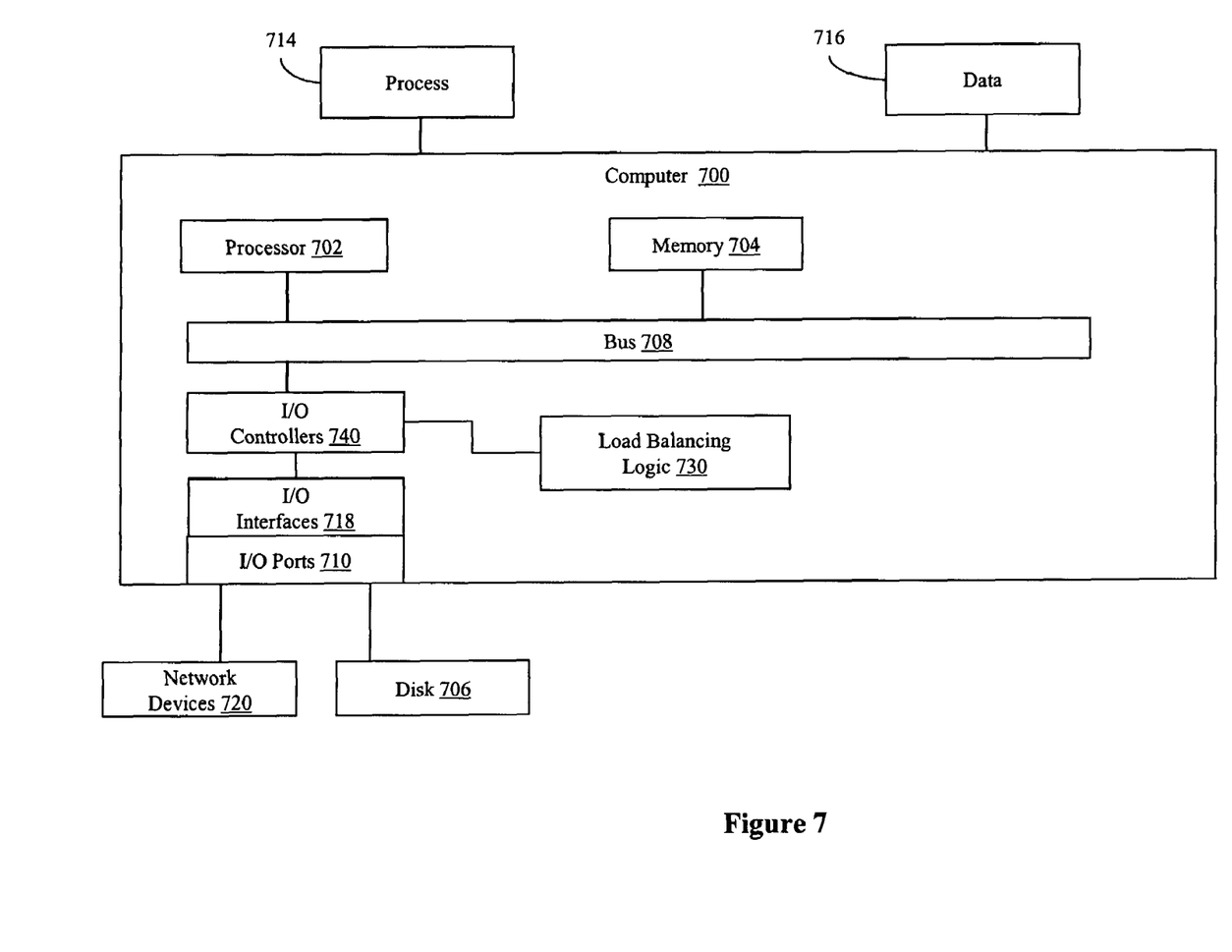
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, the computer 700 may include a load balancing logic 730 configured to facilitate receive load balancing for transmitted network communications. The load balancing logic 730 can be operably connected to an appropriate logic within the computer 700 like an I/O controller 740, and/or may be an executable process used by other networking logic. The load balancing logic 730 can be implemented similar to the load balancing logic 125, 205 described in FIGS. 1 and 2, respectively, and/or the other systems and methods described herein.

Generally describing an example configuration of the computer 700, the processor 702 can be a variety of various processors including dual microprocessor and other multiprocessor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, devices like a magnetic disk drive, a solid state disk drive, a floppy disk drive, a tape drive, a Zip drive, a flash memory card, and/or a memory stick. Furthermore, the disk 706 can include optical drives like a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like. The input/output ports 710 can include but are not limited to, serial ports, parallel ports, and USB ports.

The computer 700 can operate in a network environment and thus may be connected to network devices 720 via the i/o interfaces 718, and/or the i/o ports 710. Through the network devices 720 like a network interface card (NIC), the computer 700 may interact with a network. Through the network, the computer 700 may be logically connected to remote computers. In one example, the network interface can be configured to operably connect the computing device 700 to a second computing device as a point-to-point connection where the second computing device includes a group of network adapters configured as a network team. The computing device 700 can include a data store configured to maintain media access control (MAC) addresses assigned to individual network adapters of the group of network adapters in the second computing device. The data store can be configured similar to previous examples of data stores. The data store can be used by the load balancing logic 730 as previously described.

Other example networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 720 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system configured to provide load balancing where network traffic is transmitted from a transmitting node to a receiving node that are point-to-point nodes on a same network layer, the receiving node including a plurality of network adapters that function as a single logical adapter and are identified by other network nodes as a single node, the system comprising:
   a load balancing logic configured to cause different portions of the network traffic to be transmitted from the transmitting node to different network adapters in the receiving node to cause the network traffic to be receive load balanced by replacing a destination node address in the network traffic directed to the single logical adapter to varying destination node addresses of the plurality of network adapters in the receiving node.

2. The system of claim 1 where the receiving node is identified by network nodes with a single protocol address and a single media access control (MAC) address, where an address resolution protocol (ARP) table resolves the single protocol address of the receiving node to the single MAC address, the system comprising:
   a data store configured to resolve the single protocol address of the receiving node to a plurality of MAC addresses associated with the plurality of network adapters in the receiving node.

3. The system of claim 2, the load balancing logic being configured to replace the destination node address with a selected MAC address from the data store.

4. The system of claim 2 where the ARP table, the data store and the load balancing logic are local to the transmitting node.

5. The system of claim 1, the load balancing logic being configured to access a data store configured to associate multiple MAC addresses to a single protocol address assigned to the receiving node, where the destination node address includes a MAC address from the data store.

6. The system of claim 5, where the load balancing logic being configured to select destination MAC addresses from the multiple MAC addresses in the data store.

7. A system configured to provide load balancing where network traffic is transmitted from a transmitting node to a receiving node that are point-to-point nodes on a same network layer, the receiving node including a plurality of network adapters that function as a single logical adapter and are identified by other network nodes as a single node, the system comprising:
   a load balancing logic configured to cause different portions of the network traffic to be transmitted from the transmitting node to different network adapters in the receiving node to cause the network traffic to be receive load balanced; and
   where the network traffic includes frames, and the load balancing logic being configured to change the destination node addresses in the frames to cause the frames to be receive load balanced between the plurality of network adapters rather than being received by the single logical adapter.

8. A system for point-to-point load balancing, comprising:
a first computing device being operably connected to a second computing device over the same broadcast domain;
the second computing device being configured to include a group of network adapters configured as a network team, the group of network adapters having an assigned team media access control (MAC) address and a team protocol address;
a data store configured to be accessible by the first computing device and being configured to maintain MAC addresses assigned to individual network adapters of the group of network adapters in the second computing device; and
a load balancing logic configured to influence a receive load balancing on the second computing device by re-assigning a destination MAC address for network traffic to be transmitted from the first computing device to the network team of the second computing device including selecting a MAC address from the data store.

9. The system of claim 8 where the group of network adapters are configured as a network team by functioning as a single virtual network adapter.

10. The system of claim 8 where the broadcast domain corresponds to a data link layer.

11. The system of claim 10 where the first computing device and the second computing device are connected on an Ethernet network including a switch.

12. The system of claim 8 where the group of network adapters include network interface cards.

13. The system of claim 8, the network team being identified by remote devices as a single node according to the team protocol address, and the data store being configured to associate multiple MAC addresses from the group of network adapters to the team protocol address.

14. The system of claim 8 where the network traffic includes one or more frames.

15. The system of claim 8 the first computing device including a group of network adapters being configured as a network team.

16. The system of claim 15, the load balancing logic being configured to cause the network traffic to be transmitted from one or more adapters from the group of network adapters of the first computing device, and to cause the network traffic to be received by multiple network adapters of the second computing device.

17. The system of claim 8, the load balancing logic being configured to re-assign a destination MAC address for different portions of the network traffic to cause the different portions to be received by different network adapters of the network team.

18. The system of claim 8 where one or more adapters of the group of network adapters includes an associated port attribute that is maintained in the data store; and
the load balancing logic being configured to re-assign the destination MAC address to a selected network adapter based on the associated port attribute of the selected network adapter.

19. The system of claim 18, the associated port attribute including one or more of: port speed, and port cost.

20. The system of claim 8, the load balancing logic being configured to select a MAC address from the data store using a selection algorithm.

21. The system of claim 20, the selection algorithm being based on one of the following: a sequential selection, a random selection, a selection based on a port attribute of a network adapter.

22. A method of transmitting network communications including frames between two point-to-point end nodes of a network where at least one of the end nodes includes a virtual network adapter configured with a plurality of network adapters, the method comprising:
replacing a destination node address, in a plurality of frames directed to the virtual network adapter, to a destination node address of different individual network adapters from the plurality of network adapters, and
transmitting the plurality of frames to the replaced destination node addresses to cause the plurality of frames to be receive load balanced between the plurality of network adaptors rather than being received by a single node address of the virtual network adapter.

23. The method of claim 22 where the transmitting occurs between the two point-to-point end nodes being on the same data link layer network.

24. The method of claim 22 including:
maintaining a data store that includes individual node addresses of the plurality of network adapters associated with the virtual network adapter;
determining, for a frame having a first destination node address, whether the first destination node address is directed to the virtual network adapter, and if so;
selecting an individual node address from the data store to replace the first destination node address.

25. The method of claim 22 where the node address is a media access control (MAC) address.

26. The method of claim 22, where the replacing a destination node address includes selecting an alternative destination node address of an individual network adapter from the plurality of network adapters based on a port attribute of the individual network adapter.

27. A computer-readable medium providing processor executable instructions operable to perform the method of claim 22.

28. A computer-readable medium providing processor executable instructions operable to perform a method, the method comprising:
determining whether network communications are directed to a receiving node that is connected point-to-point and that includes a team of network adapters, where the receiving node is identified by a team protocol address and a team hardware address;
selecting a replacement hardware address for the network communications from a list of hardware addresses corresponding to the team of network adapters;
directing the network communications to be received load balanced by the team of network adapters by periodically replacing the destination address to a selected replacement hardware address.

29. A computer-readable medium having stored thereon a data structure comprising:
a first field containing data representing a software address for a network node;
one or more second fields containing data representing an association of a plurality of hardware addresses assigned to the network node that correspond to the software address, the plurality of hardware addresses being assigned to a plurality of network adapters that are configured as part of the network node; and the data structure being configured to resolve the software address to any of the plurality of hardware addresses to allow a logic to cause network communications directed to the network node to be receive load balanced among the plurality of network adapters.

30. The computer-readable medium of claim 29 where the software address is a protocol address and the hardware address is a media access control (MAC) address.

31. The computer-readable medium of claim 29 where the software address is a layer three network address and the hardware address is a layer two network address.

32. The computer-readable medium of claim 29 where the plurality of network adapters are configured as a single logical adapter where the network node is identified by other network nodes as the single logical adapter by a single software address and a single hardware address.

33. A computing device comprising:
a network interface configured to operably connect the computing device to a second computing device as a point-to-point connection where the second computing device includes a group of network adapters configured as a network team;
a data store configured to maintain media access control (MAC) addresses assigned to individual network adapters of the group of network adapters In the second computing device; and
a load balancing logic configured to influence a receive load balancing on the second computing device by re-assigning a destination MAC address for network traffic to be transmitted from the computing device to the network team of the second computing device using various MAC addresses from the data store.

* * * * *

UNITED STATES PATENT AND TRADEMARK OFFICE
CERTIFICATE OF CORRECTION

PATENT NO. : 7,505,399 B2 Page 1 of 1
APPLICATION NO. : 10/917677
DATED : March 17, 2009
INVENTOR(S) : Michael Sean McGee et al.

It is certified that error appears in the above-identified patent and that said Letters Patent is hereby corrected as shown below:

In column 16, line 9, in Claim 33, delete "In" and insert -- in --, therefor.

Signed and Sealed this

Eighth Day of September, 2009

David J. Kappos
*Director of the United States Patent and Trademark Office*